US006968851B2

(12) United States Patent
Ramirez et al.

(10) Patent No.: US 6,968,851 B2
(45) Date of Patent: Nov. 29, 2005

(54) DOUBLE BLOCK VALVE WITH PROVING SYSTEM

(75) Inventors: James Ramirez, Randolph, NJ (US); Edward Dorsey, Randolph, NJ (US); Thomas Zich, Vernon, NJ (US); Dennis Wagner, Newton, NJ (US)

(73) Assignee: ASCO Controls, L.P., Florham Park, NJ (US)

( * ) Notice: Subject to any disclaimer, the term of this patent is extended or adjusted under 35 U.S.C. 154(b) by 274 days.

(21) Appl. No.: 10/120,899

(22) Filed: Apr. 11, 2002

(65) Prior Publication Data

US 2003/0011136 A1    Jan. 16, 2003

Related U.S. Application Data

(60) Provisional application No. 60/283,030, filed on Apr. 11, 2001.

(51) Int. Cl.[7] .......................... F16K 11/20; F16K 37/00
(52) U.S. Cl. ................ 137/1; 137/312; 137/614.19; 137/565.23; 137/557
(58) Field of Search ................... 73/40.5 R, 46; 137/240, 312, 467.5, 614.16, 614.17, 614.18, 137/614.19, 565.01, 565.23, 551, 552, 557; 137/1

(56) References Cited

U.S. PATENT DOCUMENTS

| | | | |
|---|---|---|---|
| 3,827,285 A | 8/1974 | Grove | 73/46 |
| 4,349,885 A * | 9/1982 | Thompson | 137/487.5 |
| 4,373,545 A | 2/1983 | Knappe | 137/240 |
| 4,458,706 A | 7/1984 | Scholes | 134/166 R |
| 4,587,619 A | 5/1986 | Converse, III et al. | 702/51 |
| 4,798,223 A | 1/1989 | Mitchell et al. | 137/312 |
| 4,806,913 A | 2/1989 | Schmidt | 340/679 |
| 4,825,198 A | 4/1989 | Rolker et al. | 340/605 |
| 4,846,212 A | 7/1989 | Scobie et al. | 137/240 |
| 4,911,192 A * | 3/1990 | Hartfiel et al. | 137/487.5 |
| 5,165,443 A | 11/1992 | Buchanan | 137/312 |
| 5,190,068 A * | 3/1993 | Philbin | 137/487.5 |

(Continued)

OTHER PUBLICATIONS

International Search Report for PCT Application No. PCT/US 02/11365 dated Aug. 28, 2002.

*Primary Examiner*—Kevin Lee
(74) *Attorney, Agent, or Firm*—Locke Liddell & Sapp, LLP

(57) ABSTRACT

A double block valve and a valve proving system are disclosed. The double block valve is actuated by a single actuator and includes a valve body housing a cavity. The cavity defines an upstream portion with a fluid inlet and a downstream portion with a fluid outlet. A seating assembly is interposed between the upstream and the downstream portions. A first and a second blocking element are disposed in the valve body and are both movable within the cavity between opened and closed positions. With the first and second blocking elements both contacting the seating assembly, the space therebetween defines an enclosed space with a finite volume. The proving system is used for two safety shut-off valves on a valve train, such as a double block valve. The proving system connects to an enclosed space established between the two safety shut-off valves and includes a pair of three-way valves, oppositely biased pressure switches, and a pump, all of which are interconnected through pneumatic conduits. The proving system uses pressure accumulation and timed decay to determine the integrity of the two safety shut-off valves of the valve train.

26 Claims, 12 Drawing Sheets

U.S. PATENT DOCUMENTS

| | | | |
|---|---|---|---|
| 5,267,587 A | * 12/1993 | Brown | 137/487.5 |
| 5,307,620 A | 5/1994 | Hamahira et al. | 60/39.06 |
| 5,441,070 A | * 8/1995 | Thompson | 137/487.5 |
| 5,621,164 A | 4/1997 | Woodbury et al. | 73/40.5 R |
| 5,699,825 A | 12/1997 | Norton | 137/238 |
| 5,781,116 A | 7/1998 | Hedger et al. | 340/606 |
| 5,827,950 A | 10/1998 | Woodbury et al. | 73/40.5 R |
| 5,979,488 A | 11/1999 | Smith et al. | 137/312 |
| 6,014,983 A | 1/2000 | Sondergaard et al. | 137/312 |
| 6,128,946 A | 10/2000 | Leon et al. | 73/46 |
| 6,134,949 A | 10/2000 | Leon et al. | 73/40.5 A |
| 6,216,726 B1 | * 4/2001 | Brown et al. | 137/487.5 |

* cited by examiner

DOUBLE BLOCK VALVE WITH PROVING SYSTEM

CROSS REFERENCE TO RELATED APPLICATIONS

This application claims priority of the Provisional Application No. 60/283,030 filed Apr. 11, 2001.

FIELD OF THE INVENTION

The present invention relates generally to a double block valve and, more particularly to a double block valve, wherein the integrity of the valve seals may be tested by a proving system.

BACKGROUND OF THE INVENTION

Most combustion gas trains are required by national and/or local codes to use two safety shut-off valves in series on the main line to the burner. Depending upon the capacity rating, two safety shut-off valves in series may be required on the pilot line as well. Double block valves have been designed to meet this requirement by providing two independent sealing members in series in a single valve body. By eliminating the need for two separate valve bodies, the double block valve reduces the length of the fuel train and the requisite installation costs. Additionally, the double block valve eliminates several piping connections, which incrementally reduces the probability of external leaks. In some prior art double block valves, the two sealing members of the double block valve have impeded the fluid flow through the valve body and thus reduced the valves effectiveness. Existing double block valves may also have a substantial captured volume between the sealing members, which holds a large amount of gas or liquid when the sealing members are sealed.

Some installations on fuel trains use a double block valve with a vent system that places a normally open valve between the two sealing members. Any leakage from the upstream sealing member is vented to the atmosphere. Designing the venting system may prove to be expensive and may further complicate the proper sealing of the two sealing members in the double block valve. Furthermore, the venting system may expel the volatile organic compounds into the atmosphere, which is environmentally undesirable.

The same codes that require two safety shut-off valves on the burner line also mandate that the safety shut-off valves be tested on a regular basis to insure the integrity of the internal seals or blocks. The testing is usually performed manually and involves removing plugs from test ports on the valve body. For example, if a gaseous fuel is being valved, a combination of manual test cocks, rubber tubing, and a container filled with solution may be used to check for leakage of the sealing members in the double block valve. The appearance of gas bubbles in the solution identifies leakage. The determination of an acceptable leakage rate is often based upon the operator's judgement of the size and number of bubbles present.

The present invention is directed to an improved double block valve and a proving system and method, which may be used with first and second safety shut-off valves or with the improved double block valve.

SUMMARY OF THE INVENTION

One aspect of the present invention provides a double block valve, including a seating assembly, a first blocking element, and a second blocking element. The seating assembly is positioned in the valve and defines a fluid passageway communicating a valve inlet with a valve outlet. The seating assembly includes a first seat interposed within the fluid passageway and includes a second seat distanced from the first seat and interposed within the fluid passageway. The first blocking element is coupled to the actuator and is movable by the actuator out of sealing engagement with the first seat. The second blocking element is movable by the first assembly out of sealing engagement with the second seat of the seating assembly. An enclosed space having a finite volume is established between the first and second blocking elements when both are sealingly engaged with the seating assembly.

Another aspect of the present invention provides a double block valve operated by an actuator and including a seating assembly, a first blocking assembly, and a second blocking assembly. The seating assembly is positioned in the valve and defines a fluid passageway communicating an upstream portion with a downstream portion of the valve. The seating assembly includes a first seat on one side of the assembly exhibited to the upstream portion and circumscribing the fluid passageway. The seating assembly also includes a second seat on the one side and circumscribing the first seat. The first blocking assembly includes a first stem coupled to the actuator and movably disposed in the downstream portion of the valve. The first stem has a distal end extended through the fluid passageway and into the upstream portion. The first blocking assembly also includes a first disc attached to the distal end of the first stem and movable by the actuator out of sealing engagement with the first seat. The second blocking assembly includes a second stem movably disposed in the upstream portion of the valve and having a distal end. The second blocking assembly also includes a second disc connected to the distal end of the second stem and movable by the first assembly out of sealing engagement with the second seat. An enclosed space having a finite volume is established between the first and second discs when engaged with the seating assembly.

Yet another aspect of the present invention provides a double block valve having integral prove and being operated by an actuator. The double block valve includes first means for blocking fluid communication from a valve inlet to a valve outlet and second means for blocking fluid communication from the valve inlet to the valve outlet. The valve includes means for seating the first and second blocking means. The valve also includes means for moving the first blocking means with the actuator out of sealing engagement with the seating means and means for moving the second blocking means with the first blocking means out of sealing engagement with the seating means. The valve further includes means for establishing an enclosed space with a finite volume between the first and second blocking means when sealingly engaged with the seating means and means for communicating the enclosed space with a port defined in the valve.

One aspect of the present invention provides a valve proving system for first and second safety shut-off valves. The proving system includes a first selectable valve, a second selectable valve, one or more devices for determining or measuring volumetric flow rate, and a pump. The first selectable valve is in communication with a controlled volume established between the first and second safety shut-off valves. The second selectable valve is in communication with an outlet. The one or more devices for determining or measuring volumetric flow rate are interconnected between the first and second selectable valves. The pump is interconnected between the first and second selectable valves and is operable to evacuate fluid from the controlled volume to the outlet. The first selectable valve is selectively operable to communicate the controlled volume with the one or more devices and the pump or with the second selectable valve. The second selectable valve is selectively operable to communicate the outlet with the first selectable valve or with the one or more devices and the pump.

Another aspect of the present invention provides a proving device. The proving device includes a first port, a second port, a first three-way valve, one or more devices for determining or measuring volumetric flow rate, a pump, and a second three-way valve. The proving device has a first port communicating with a finite volume established between a first and a second safety shut-off valve and has a second port communicating with a outlet. The first three-way valve is selectively operable to communicate the first port to either a bypass conduit or a main conduit. The one or more devices for determining or measuring volumetric flow rate are connected to the main conduit. The pump is connected to the main conduit. The second three-way valve is selectively operable to communicate the second port to either the bypass conduit or the main conduit.

Yet another aspect of the present invention provides a method for proving sealing engagement of a first safety shut-off valve and a second safety shut-off valve. The method includes the steps of: closing the first and second safety shut-off valves to establish a controlled volume therebetween; purging fluid from the controlled volume to an outlet; isolating the controlled volume in communication with a pressure sensor; measuring for a first volumetric flow rate within the controlled volume with the pressure sensor; and indicating a first alarm condition if the first volumetric flow rate exceeds a first predetermined rate. The method also includes reducing pressure in the controlled volume to a predetermined level; measuring for a second volumetric flow rate within the controlled volume; and indicating a second alarm condition if the second volumetric flow rate in the controlled volume exceeds a second predetermined rate.

The foregoing summary is not intended to summarize each potential embodiment, or every aspect of the inventions disclosed herein, but merely to summarize the appended claims.

BRIEF DESCRIPTION OF THE DRAWINGS

The present invention, including a preferred embodiment and other aspects, will be best understood with reference to the detailed description of specific embodiments of the invention, which follows, when read in conjunction with the accompanying drawings, in which.

Figure 1:
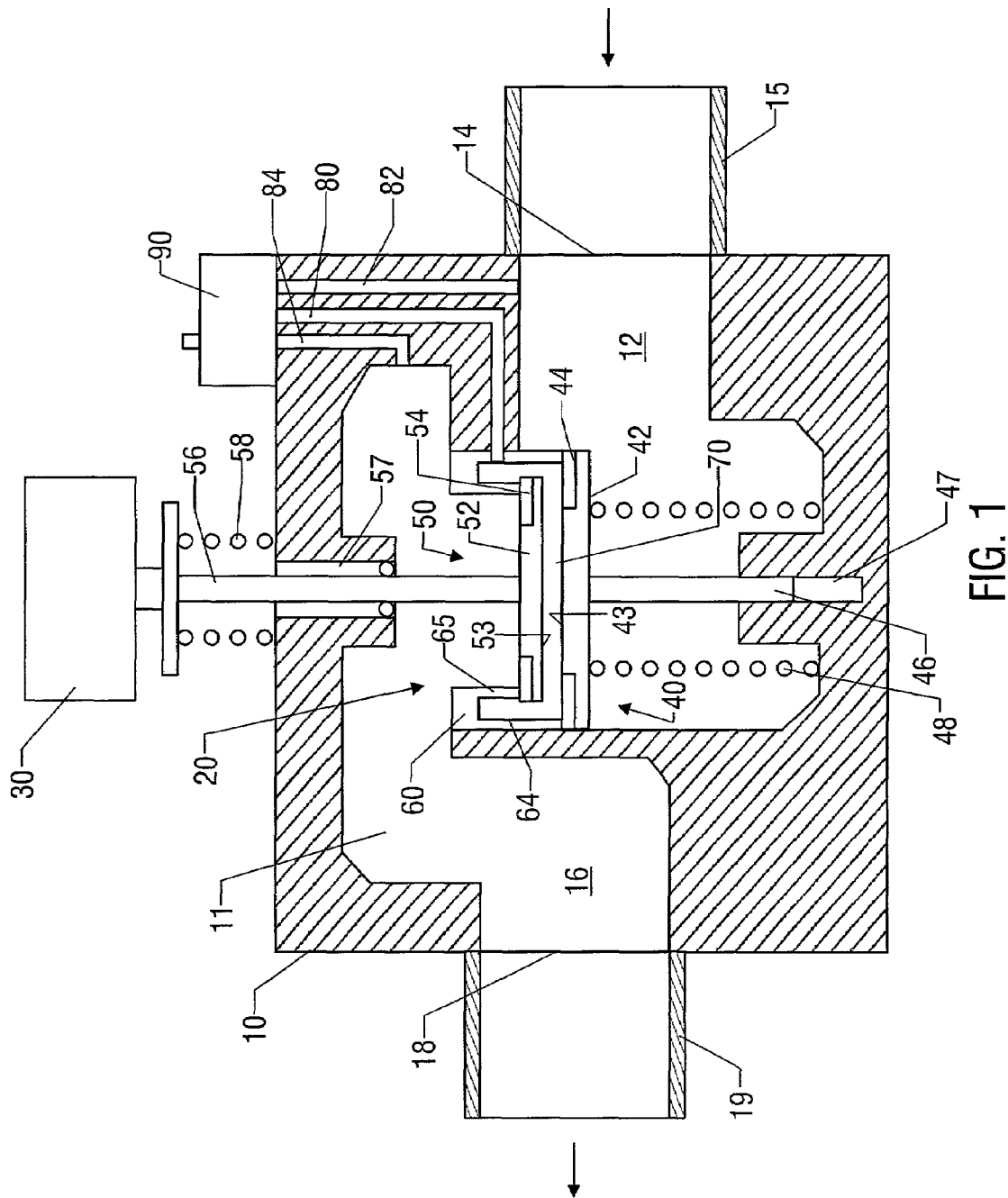
FIG. 1 illustrates a schematic diagram of a double block valve according to the present invention.

While the inventions described herein are susceptible to various modifications and alternative forms, only specific embodiments have been shown by way of example in the drawings and will be described in detail herein. However, it should be understood that the inventions are not to be limited to or restricted by the particular forms disclosed herein.

DETAILED DESCRIPTION OF THE INVENTION

Referring to FIG. 1, a schematic diagram illustrates a normally closed, double block or double seal valve according to the present invention. The double block valve includes a valve body 10, a double block assembly 20, and an actuator 30. The double block valve may also include test ports 80, 82 and/or 84 and a proving device 90.

Depending on the properties of the fluid being controlled, the valve body 10 may be composed of various materials, including metals or composites known in the art for use with the given system. The valve body 10 houses a cavity 11. The cavity 11 is divided into an upstream portion 12 with a fluid inlet 14 and a contiguous downstream portion 16 with a fluid outlet 18. An external connection 15 of the fuel train connects to the inlet 14 and carries the controlled fluid into the upstream portion 12 of the valve body 10. A second external connection 19 connects to the outlet 18 and carries the controlled fluid out of the downstream portion 16 to a device, such as a burner (not shown).

Two, independent safety shut-off valves, referred to herein as the double block assembly 20, are disposed in the cavity 11 of the valve body 10 between the upstream portion 12 and the downstream portions 16. The double block assembly 20 provides two "blocks" or safety shut-off valves for sealing the upstream portion 12 from the downstream portion 16. In particular, the double block assembly 20 includes a first shut-off valve or blocking assembly 40, a second shut-off valve or blocking assembly 50, and a seating assembly 60. To create a double block, the first and second blocking assemblies 40, 50 contact the seating assembly 60, which is interposed between the upstream portion 12 and the downstream portion 16.

The first blocking assembly 40 includes a first blocking element 42, a seal 44, a stem 46, and a biasing member 48. The first blocking element 42 is positioned on an end of the stem 46. The blocking element 42 and stem 46 construction is moveable between a first, closed and a second, opened position within the cavity 11. A portion of the stem 46 is disposed in a receiver 47 in the valve body 10, which guides the first blocking element 42 from the first position to the second position. The seal 44 is preferably located adjacent to the outer periphery of the first blocking element 42. The seal 44 creates a seal with a first seat 64 on the seating assembly 60 when the first blocking element 42 is in the first or closed position. Depending on the properties of the controlled fluid used in the valve 10, the seal 44 may be composed of various materials, such as an elastomer, copolymer, metal, or other type of seal material known in the art for use with the controlled fluid.

The biasing member 48 is disposed about the stem 46, and in the absence of other forces, the biasing member 48 urges the first blocking element 42 into sealing engagement with the first seat 64. With the first blocking element 42 sealingly engaging the first seat 64, the seal 44 closes off the upstream portion 12 of the cavity 11 from the downstream portion 16 and creates a first block or safety shut-off valve for the double block valve of the present invention.

The second blocking assembly 50 includes a second blocking element 52, a seal 54, a second stem 56, and a second biasing member 58. The second blocking element 52 is positioned on an end of the stem 56. The blocking element 52 and stem 56 construction is movable between a first, closed and a second, opened position within the cavity 11. A portion of the stem 56 is disposed in a sealed receiver 57 in the valve body 10. The stem 56 guides the second blocking element 52 between the closed and opened positions. The seal 54 is preferably located adjacent to the outer periphery of the second blocking element 52. The seal 54 creates a seal with the second seat 65 when the second blocking element 52 is in the first or closed position.

The biasing member 58 is disposed about the stem 56, and in the absence of other forces, the biasing member 58 urges the second blocking element 52 to sealing engagement with a second seat 65 of the seating assembly 60. With the second blocking element 52 engaging the second seat 65, the seal 54 closes off the upstream portion 12 from the downstream portion 16 and creates a second block or safety shut-off valve for the double block valve of the present invention. When both the first blocking element 42 and the second blocking element 52 are closed, as shown in FIG. 1, an enclosed space 70 of fixed volume is defined therebetween.

The double block valve of the present invention is preferably operated using a single actuator 30. The actuator 30 may employ a solenoid valve or a hydraulic, electric, or pneumatic motor, among other devices known in the art to actuate valves. When activated, the actuator 30 provides a motive force on the second stem 56, which overcomes the closing force of the biasing member 58. The actuator 30 moves the second blocking element 52 away from the second seat 65. Consequently, the sealing engagement between the seal 54 and the seat 65 is broken, and the enclosed space 70 communicates with the downstream portion 16.

With further activation, the distance between the second blocking element 52 and the first blocking element 42 decreases until the second blocking element 52 contacts the first blocking element 42. The actuator 30 overcomes the additional closing force of the first biasing member 48 and fuel pressure and moves the first blocking element 42 away from the first seat 64. Therefore, the sealing engagement between the seal 44 and the seat 64 is also broken. Thereafter, the upstream portion 12 is in open communication with the downstream portion 16, and fluid may flow through the valve 10.

In the event that the controlled fluid is a compressible gas, contact between the first and second blocking elements 42, 52 will be relatively unhindered by the compressible gas. On the other hand, if the controlled fluid is an incompressible or viscous liquid, a thin layer of fluid may form between the first and second blocking elements 42, 52. Essentially, the thin layer may act as a solid contact between the first and second blocking elements 42, 52. The contact surfaces 43 and 53 of the respective blocking elements 42, 52 are preferably uniform and may include soft pads or bumpers if necessary.

The double block valve 10 may include test ports 80, 82, and 84 for testing the integrity of the seals 44 and 54 within the double block assembly 20. The test ports 80, 82 and 84 may be used with conventional methods for testing the seals of the double block valve 10. As such, the double block valve 10 may further include a manual or automated proving device 90 for testing the integrity of the seals 44 and 54 within the double block assembly 20.

As noted above, the space between the first and second blocking elements 42, 52 and the seating assembly 60 defines the enclosed space 70. If the seals 44 and 54 are properly seated, the enclosed space 70 establishes a controlled and fixed volume by which the integrity of the first and second blocking elements 40 and 50 may be tested independently of each other. In one embodiment, the device 90 may include an automated proving system, which monitors changes in volumetric flow rate over a fixed period. The device 90 may include pressure transducers, pressure switches, valves, pumps, control circuitry or relays. Because the volume in the enclosed space 70 is fixed and may even be evacuated of fluid to form a vacuum, any positive or negative changes in pressure can be monitored at pre-set time increments. The increments may be calculated to check for leakage across the first and second blocking assemblies 40 and 50 at rates that meet current industry requirements. In a preferred embodiment, the device 90 may include an automated valve proving system as disclosed herein.

Communicating with the enclosed space 70, a first test port 80 routes from the enclosed space 70 though the valve body 10 and couples to the pressure-testing device 90. The device 90 may measure the pressure in the enclosed space 70 using a pressure sensor (not shown) in the device 90. Additionally, the device 90 may purge fluid from the enclosed space 70 or create a vacuum within the enclosed space 70 using valves and a pump (not shown). A second test port 82 may communicate the device 90 with the upstream portion 12 of the valve body 10. Using the second test port 82, the device 90 may measure the pressure of the controlled fluid in the upstream portion 12 or the differential pressure between the upstream portion 12 and the enclosed space 70. Similarly, a third test port 84 may communicate the device 90 with the downstream portion 16 of the valve body 10. Using the third test port 84, the device 90 may measure the pressure of the controlled fluid in the downstream portion 16, a differential pressure or purge fluid from the enclosed space 70 to the downstream portion 16.

Figure 2A:
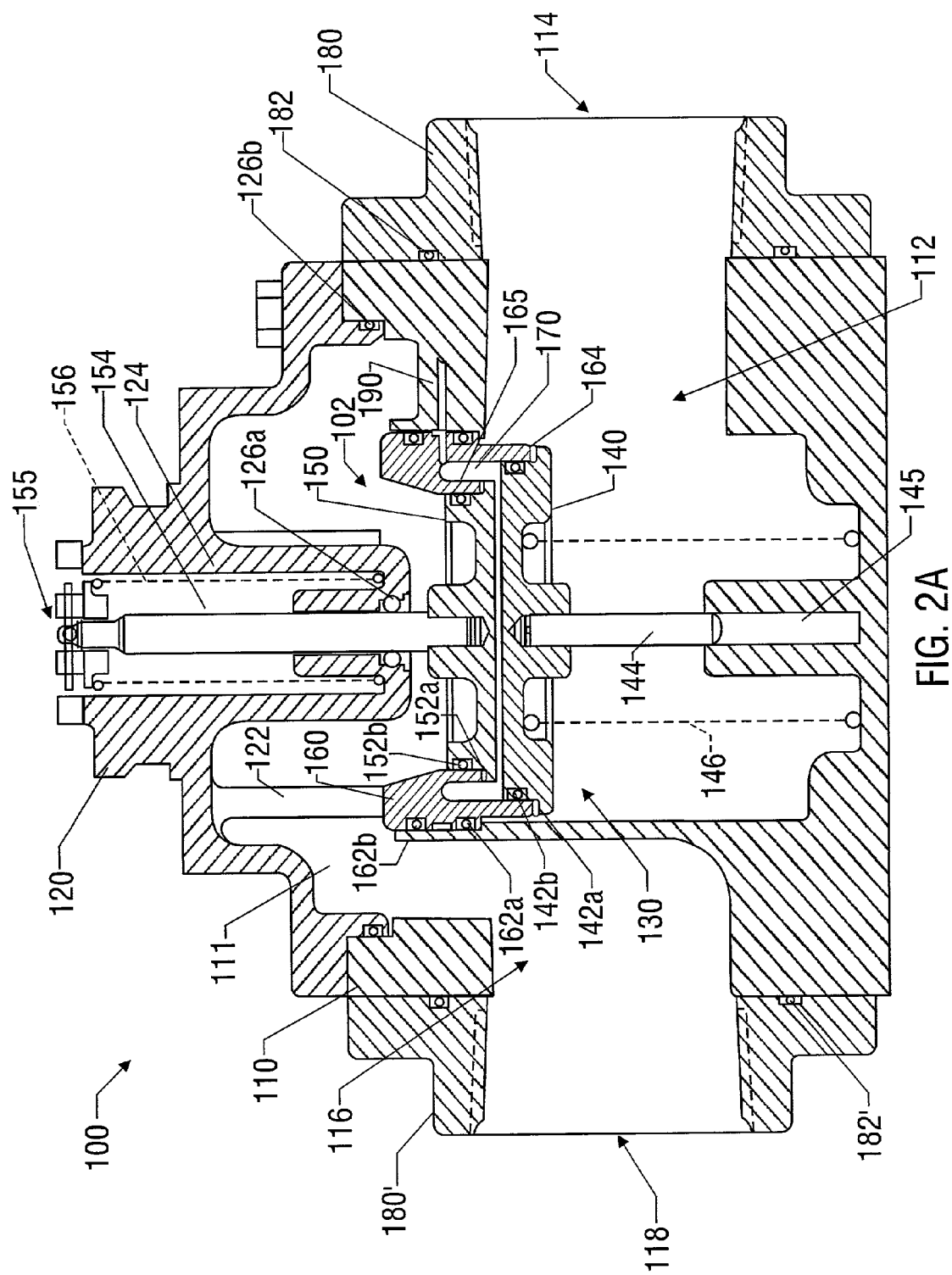
FIG. 2A illustrates an embodiment, in cross-section, of a double block valve in a closed position.

Turning now to FIG. 2A, an embodiment of a double block valve 100 according to the present invention is illustrated in cross-section. The double block valve 100 includes a valve body 110, a bonnet 120, and a double block assembly 130. The valve body 100 is preferably composed of aluminum and may be used as a double block safety valve for a gas fuel train to a burner (not shown). The valve body 110 defines a cavity 111 therein. The cavity 111 is divided into an upstream portion 112 with a fluid inlet 114 and a contiguous downstream portion 116 with a fluid outlet 118. The bonnet 120 connects to the valve body 110 and encloses the downstream portion 116 of the cavity 111. The removable bonnet 120 provides for assembly and replacement of the double block assembly 130 within the valve body 110.

The double block assembly 130 is disposed in the cavity 111 of the valve body 110 between the upstream portion 112 and the downstream portions 116. The double block assembly 130 provides two blocks for sealing the upstream portion 112 from the downstream portion 116. In particular, the double block assembly 130 includes a first blocking element 140, a second blocking element 150, and a seating assembly 160.

Figure 2B:
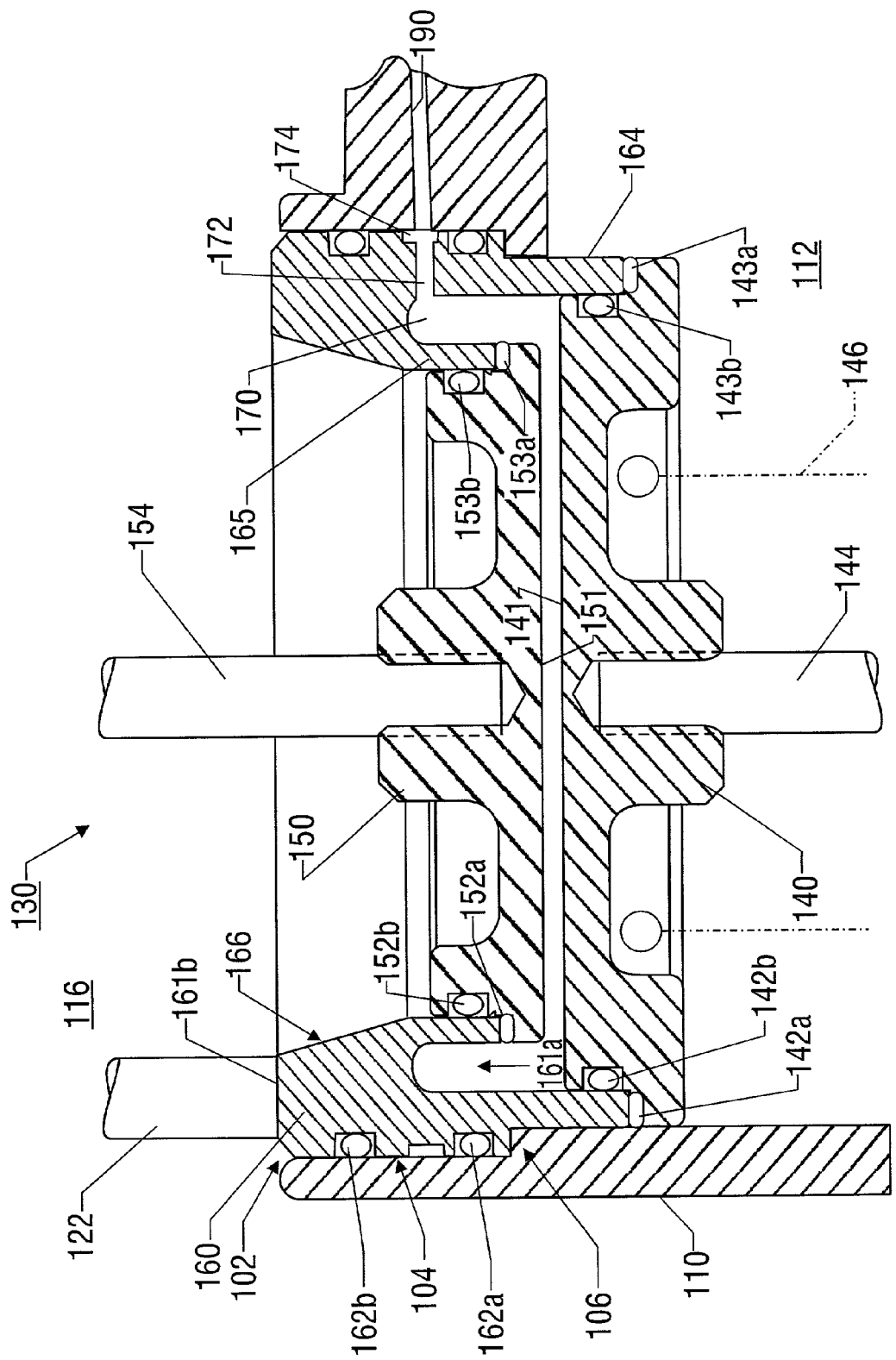
FIG. 2B illustrates a detail of the double block valve of FIG. 2A in a closed position.

Referring concurrently with the detailed illustration in FIG. 2B, the seating assembly 160 is interposed between the upstream portion 112 and the downstream portion 116 at a throat 102 in the valve body 110. The seating assembly 160 preferably defines a removable ring disposed in the throat 102. The throat 102 includes a widened, annular side 104 accommodating the seating assembly 160 and a ledge 106 for positively supporting and locating the seating assembly 160 in the throat 102. The seating assembly 160 includes two annular seats 164, 165 projecting from a first side 161 a of the ring and preferably toward the inlet portion 112 of the valve 100. The seating assembly 160 also includes a fluid passageway or orifice 166 for fluid to flow therethrough from the inlet portion 112 to the outlet portion 116.

To hold the seating assembly 160 within the throat 102, a plurality of balancing stems 122 project from the bonnet 120 and contact the seating assembly 160 on a second side 161b. In one embodiment, three balancing stems 122 are used to hold the seating assembly 160 in the throat 102. Each of the three stems 122 may be spaced approximately every 120° around the seating assembly 160 to compression fit the seating assembly 160 within the throat 102.

Seals 162a–b, preferably O-ring seals, seal the contact of the seating assembly 160 with the side 104 of the throat 102 such that the only avenue of fluid communication between the upstream portion 112 and the downstream portion 116 is through the orifice 166. The seals 162a–b seal the exterior surface of the seating assembly 160 to the throat 102 and further seal an annular passageway or gallery 174 formed around the periphery of the seating assembly 160. The sealed annular passageway or gallery 174 communicates with a first test port 190 in the valve body 110.

The first blocking element 140 is preferably a first disc with a first diameter D1. The first disc 140 is mounted on a first stem 144, which is partially disposed in a receiver 145 in the valve body 110. A biasing member or spring 146, disposed on the first stem 144, contacts the first disc 140 and the valve body 110 and provides a closure force on the first disc 140.

The first disc 140 includes seals 142a–b to provide a first block between the upstream portion 112 and the downstream portion 116 of the double block valve 100. The seal 142a is preferably a flat, annular seal, while the seal 142b is preferably an O-ring. The flat seal 142a is located on a shelf 143a around the perimeter of the first disc 140 for engaging the distal end of the first seat 164 of the seating assembly 160. The O-ring seal 142b is disposed in an annular groove 143b around the periphery of a shoulder on the first disc 140 for engaging the inner side of the first seat 164.

Use of the two seals 142a–b on the first disc 140 provides redundant sealing engagement of the disc 140 with the first seat 164 on the seating assembly 160. For the present embodiment of the double block valve 100 intended for a gas fuel train, the seals 142a–b are preferably NITRILE (BUNA-N) seals, which are composed of a copolymer of Butadiene and Acrylonitrile. NITRILE (BUNA-N) seals typically have a high acrylo-content, which makes them resistant to petroleum base oils and hydrocarbon fuels over a temperature range of −40° F. to +250° F. In addition, the seals 162a–b discussed above for the seating assembly 160 are also preferably NITRILE (BUNA-N) seals.

The first disc 140 is movable between a first, closed position and a second, opened position. As best shown in FIG. 2A, the stem 144, partially disposed in the receiver 145 in the valve body 110, guides the first disc 140 to the first seat 164. The spring 146, disposed on the stem 144, urges the disc 140 to the closed position. In the closed position as shown in FIGS. 2A and 2B, the first disc 140 engages the first seat 164 and seals the upstream portion 112 from the downstream portion 116. In the absence of contrary forces, the spring 146 urges the first disc 140 to engage the first seat 164 on the seating assembly 160. Moreover, any fluid pressure in the upstream portion 112 may additionally urge the first disc 140 against the first seat 164. With the first disc 140 engaged with the first seat 164, the seals 142a–b provide a first block and redundant seal to close the upstream portion 112 from the downstream portion 116.

The second blocking element 150 is adjacent to the first blocking element 140 and defines a second disc with a second diameter D2. The second diameter D2 is preferably less than the first diameter D1 of the first disc 140, although such need not be the case. The second disc 150 is mounted on a second stem 154 that axially opposes the first stem 144 of the first disc 140. The second stem 154, partially disposed in a sealed receiver 124 of the bonnet 120, guides the motion of the second disc 150 within the valve cavity 111. A second biasing member or spring 156 is disposed on the stem 154 and provides a closure force on the second disc 150.

As best shown in FIG. 2B, the second disc 150 includes seals 152a–b to provide a second redundant seal between the upstream portion 112 and the downstream portion 116 of the double block assembly 130. The seal 152a is preferably a flat, annular seal, while the seal 152b is preferably an O-ring. The flat seal 152a is located on a shelf 153a around the perimeter of the second disc 150 for engaging the distal end of the first seat 165 of the seating assembly 160. The O-ring 152b is disposed in an annular groove 153b on a shoulder around the periphery of the second disc 150 for engaging the inner side of the second seat 165. As before, the seals 152a–b are preferably NITRILE (BUNA-N) seals.

The second disc 150 is also movable between a first, closed position and a second, opened position. In the closed position as shown in FIGS. 2A and 2B, the second disc 150 engages a second seat 165 on the seating assembly 160 and seals the upstream portion 112 from the downstream portion 116. In the absence of other forces, the spring 156 urges the second disc 150 to engage the second seat 165. With the second disc 150 engaged with the second seat 165, the seals 152a–b provide a second block and redundant seal to close the upstream portion 112 from the downstream portion 116.

In the closed position, the first and second discs 140, 150 engage the first and second seats 164, 165 respectively by the closure forces of the springs 146, 156. Each disc 140 or 150 prohibits fluid from passing from the upstream portion 112 to the downstream portion 116. In general, the pressure in the downstream portion 116 is less than the upstream portion 112. The pressure differential for the present embodiment may be up to 25 psi. Consequently, the pressure differential on the sides of the first disc 140 may further urge the first disc 140 to seal on the first seat 164. If the seals 142a–b fail, fluid may enter the enclosed space 170, causing pressure to rise in the enclosed space 170. The increased pressure may additionally urge the second disc 150 against the second seat 165, further ensuring a secure seal of the double block valve 100.

To provide representative dimensions for the present embodiment, the first diameter D1 of the first disc 140 may be approximately 2.7 inches with the shelf 143a defining a further diameter of approximately 2.9 inches. The second diameter D2 of the second disc 150 may be approximately 2.2 inches with the shelf 153a defining a further diameter of approximately 2.4 inches. The relative thickness of both discs 140, 150 may be approximately 0.40 inches. The seating assembly 160 may provide a diameter of 2.25 inches for the fluid passageway or orifice 166. The discs 140, 150 and the seating assembly 160 may all be composed of aluminum, while the stems 144, 154 may be composed of stainless steel.

When the first disc 140 and the second disc 150 are closed, as shown in FIG. 2A–B, the first disc 140 is at a fixed distance from the second disc 150. The finite distance between the discs 140, 150 may be approximately 0.06 inches. The finite distance preferably establishes a required separation, whereby the valve meets code requirements as two safety shut-off valves in series within a single valve body. The space contained by the discs 140, 150 and the seating assembly 160 defines an enclosed space 170. In the present embodiment, the enclosed space 170 may have a volume of approximately 15 cc.

As best shown in FIG. 2B, a pathway 172 in the seating assembly 160 communicates the enclosed space 170 to the sealed annular passageway or gallery 174. The pathway 172 may be a $\frac{1}{16}^{th}$-inch hole made in the seating assembly 160. As noted above, the O-ring seals 162*a–b* seal the contact of the seating assembly 160 with the side 104 of the throat 102 so that the annular passageway or gallery 174 formed around the periphery of the seating assembly 160 is also sealed. In this way, when assembling or replacing the seating assembly 160 within the valve body 110, the pathway 172 need not be aligned with the test port 190 to allow fluid communication between the enclosed space 170 and the test port 190. Fluid pressure within the enclosed space 170, if any, may be communicated through the pathway 172 and into the sealed annular passageway or gallery 174. The annular passageway or gallery 174 may then communicate fluid or pressure to the test port 190.

If the seals 142*a–b*, 152*a–b* and 162*a–b* are properly seated, the enclosed space 170 establishes a controlled and fixed volume. Communicating with the enclosed space 170, the first test port 190 routes though the valve body 110 to the outside of the valve 100. The entire route of the first test port 190 is not shown in FIG. 2A. A second test port (not shown) may communicate the upstream portion 112 to the outside of the valve 100, and a third test port (not shown) may communicate the downstream portion 116 to the outside of the double block valve 100. The test ports allow for individually testing and verifying the integrity of the seals 142*a–b*, 152*a–b* and 162*a–b*. A device (not shown) may couple to one or more of the test ports to test the integrity of the seals 142*a–b*, 152*a–b*, and 162*a–b*.

The device may be a manual device or an automated device, which monitors changes in volumetric flow rate or pressure drop over a fixed period. The device may include pressure transducers, pressure switches, valves, pumps, control circuitry or relays. Because the volume in the enclosed space 170 is fixed and may even be evacuated of fluid to form a vacuum, any positive or negative changes in pressure can be monitored at pre-set time increments. The increments may be calculated to check for leakage across the first and second blocking elements 140 and 150 at rates that meet current industry requirements. In a preferred embodiment, the device may include an automated proving system as disclosed herein.

To move the first disc 140 and the second disc 150 between open and closed positions, the present invention uses a single actuator (not shown). The actuator may be a solenoid valve, motor, or other device known in the art for actuating a valve. The actuator contacts a coupling end 155 of the second stem 154. When activated, the actuator provides an axial, motive force on the second stem 154. The spring 156 is compressed and the second disc 150 is dislocated from the second seat 165. Consequently, the seals 152*a–b* are broken and the enclosed space 170 communicates with the downstream portion 116. If a small amount of fluid is contained within the enclosed space 170, it will escape into the downstream portion 116 without significant effect. If a vacuum is contained, the enclosed space 170 will equalize pressure with the downstream portion 116.

With further axial motion, the distance between the second disc 150 and the first disc 140 decreases until the second disc 150 contacts the first disc 140. In the event that the valve is used with a compressible gas, contact between the first and second discs will be relatively unhindered by the controlled fluid. On the other hand, if the valve 100 is used with an incompressible or viscous liquid, a thin layer of liquid may form between the first and second discs 140, 150 when they contact. Essentially, the thin layer may act as a solid contact between the first and second discs 140, 150. The contact surfaces 141 and 151 of the respective discs 140, 150 are preferably uniform and may include soft pads or bumpers if necessary.

Figure 3:
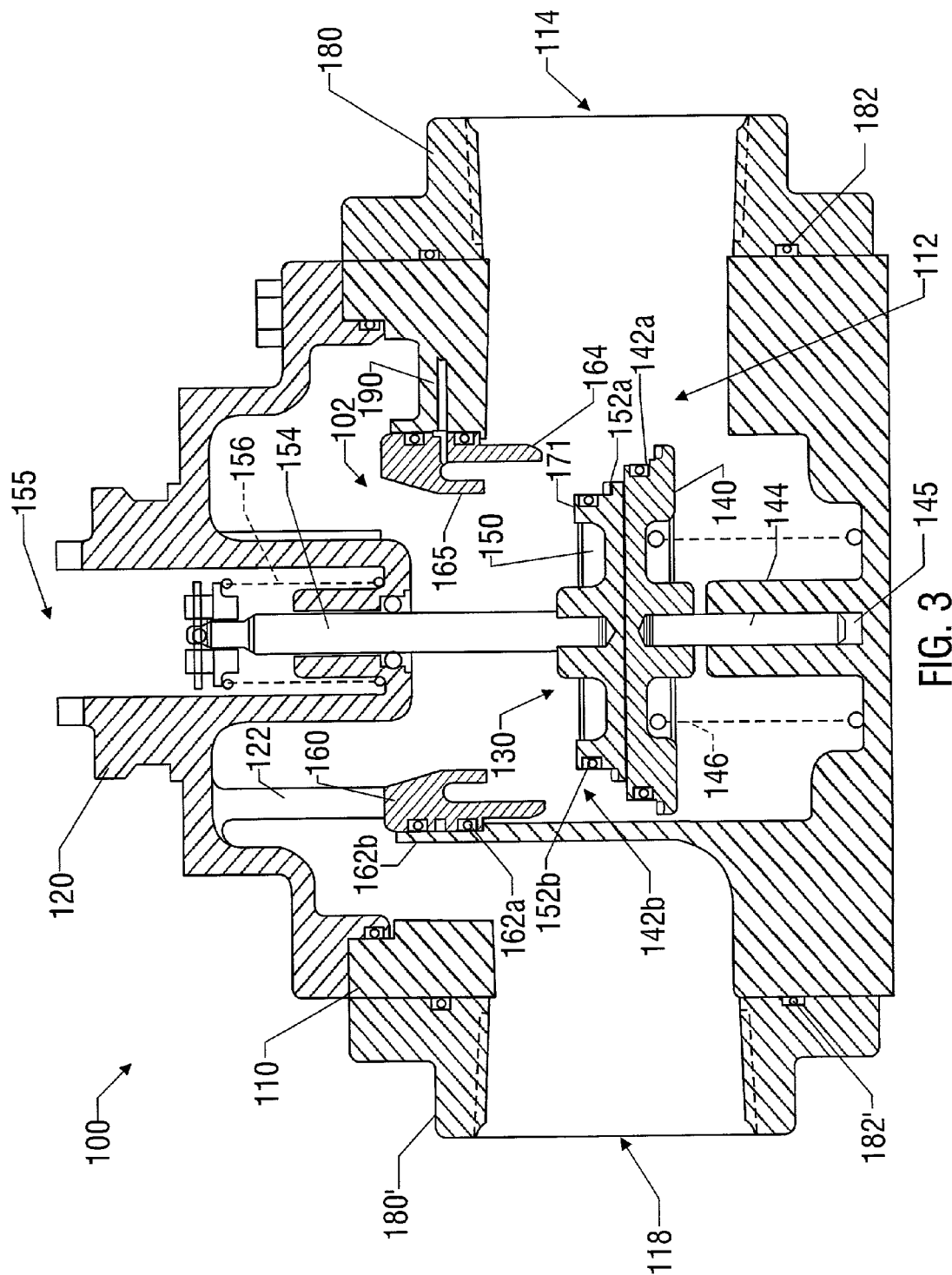
FIG. 3 illustrates the embodiment of the double block valve of FIGS. 2A–B in an opened position.

Turning now to FIG. 3, the embodiment of the double block valve 100 of FIGS. 2A and 2B is illustrated in an opened position. The actuator (not shown) has forced the second disc 150 against the first disc 140 and has overcome the biasing of the first spring 146. The first spring 146 has compressed, and the first disc 140 has dislocated from the first seat 164. Therefore, the seals 142*a–b* have also been broken and the upstream portion 112 may communicate with the downstream portion 116. With further axial motion by the actuator, the contacting discs 140 and 150 have positioned further into the upstream portion 112.

In this open position, any fluid in the upstream portion 112 may pass by the contacting discs 140, 150, pass through the orifice 166, and enter the downstream portion 116. With the first and second discs 140, 150 moved significantly from the orifice 166, the fluid is relatively unhindered and may flow through the orifice 166 without significant resistance from the discs 140 and 150.

When the axial force of the actuator is removed, the energy stored in the springs 146, 156 returns both discs 140, 150 to the closed position. The first and second discs 140, 150 preferably move in tandem with one another within the cavity 111, until the first disc 140 contacts the first seat 164. The O-ring seal 142*b* on the first disc 140 engages the inner surface of the first seat 164 and stops the flow of fluid through the orifice 166. The first disc 140 continues to travel until the flat seal 142*a* engages the distal end of the first seat 164. Consequently, the first disc 140 forms a redundant seal against the first seat 164 and creates the first block of the double block valve 100.

Prior to complete sealing engagement of the first disc 140 with the first seat 164, the second disc 150 has yet to seal against the seating assembly 160. Any fluid beyond the first disc 140 may escape to the downstream portion 116. Consequently, a pressure differential is established across the first disc 140. The pressure on the upstream side of the first disc 140 may be up to 25 psi above ambient, while the pressure on the enclosed space side of the disc 140 may be at the ambient pressure of the downstream portion 116. The second disc 150 passes the finite distance between the first and second seats 164, 165. Immediately, the O-ring seal 152*b* on the second disc 150 engages the inner surface of the second seat 165. The flat seal 152*a* then engages the distal end of the second seal 165. Consequently, the second disc 150 forms another redundant seal against the second seat 165 and creates the second block of the double block valve 100. Closure of the first and second discs 140, 150 is made independently of each other as the stems 144 and 154 are not connected and each disc 140, 150 is biased by separate springs 146, 156.

If a controlled deactivation of the actuator is used to close the valve 100, the closing of the first and second discs 140, 150 may be controlled. Controlled closing by the actuator may insure that the first disc 140 contacts the first seat 164 before the second disc 150 contacts the second seat 165. On the other hand, the springs 146 and 156 may have disparate spring constants. In the event of power failure or the immediate release of motive force from the actuator, the first spring 146 may, for example, return the first disc 140 to the closed position at a greater rate of return than the second spring 156 returns the disc 150 to the closed position.

An external flange 180 connects to the valve body 110 at the inlet 114, and another external flange 180' connects to the valve body 110 at the outlet 118. The flanges 180–180' provide the needed interface to connect the valve body 110 to external piping (not shown) of the fuel train. The flanges 180, 180' are symmetrical and bolt on the sides of the valve body 110. The flanges 180, 180' are further sealed to the valve body 110 with O-rings seals 182, 182'.

Figure 4:
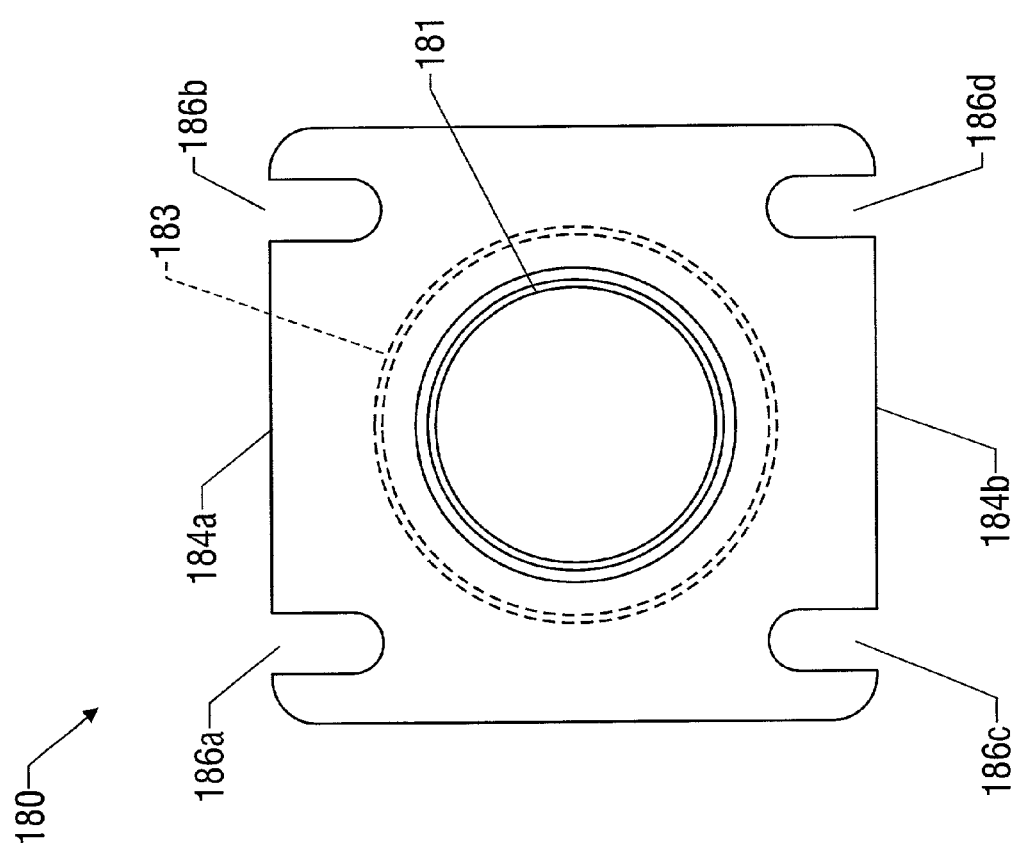
FIG. 4 illustrates an embodiment of a flange in frontal view according to the present invention.

Referring to FIG. 4, an embodiment of a flange 180 is illustrated in frontal view. The flange 180 is substantially square and defines an orifice 181 therein for the connection to piping (not shown). An annular well 183 for receiving an O-ring seal (not shown) circumscribes the orifice 181. One edge 184a of the flange 180 contains two, slotted mounting holes 186a–b. The opposing edge 184b also contains two, slotted mounting holes 186c–d. Bolts (not shown) are used to attach the symmetrical flange 180 to the side of the valve body (not shown).

The symmetry of the flange 180 and the orientation of the slotted mounting holes 186a–d at opposing quadrants allows the flange 180 to be installed either horizontally or vertically to the valve body. In this way, the flange 180 greatly simplifies the effort required to connect or disconnect the valve body to the fuel train. In particular, the valve body may be unbolted from the flange 180 and removed from the fuel train without disconnecting the external piping from the flange 180. Additionally, the valve body may be installed in or removed from the fuel train either vertically or horizontally, which provides for easy installation, removal, or replacement of the valve body in the field.

Figure 5A:
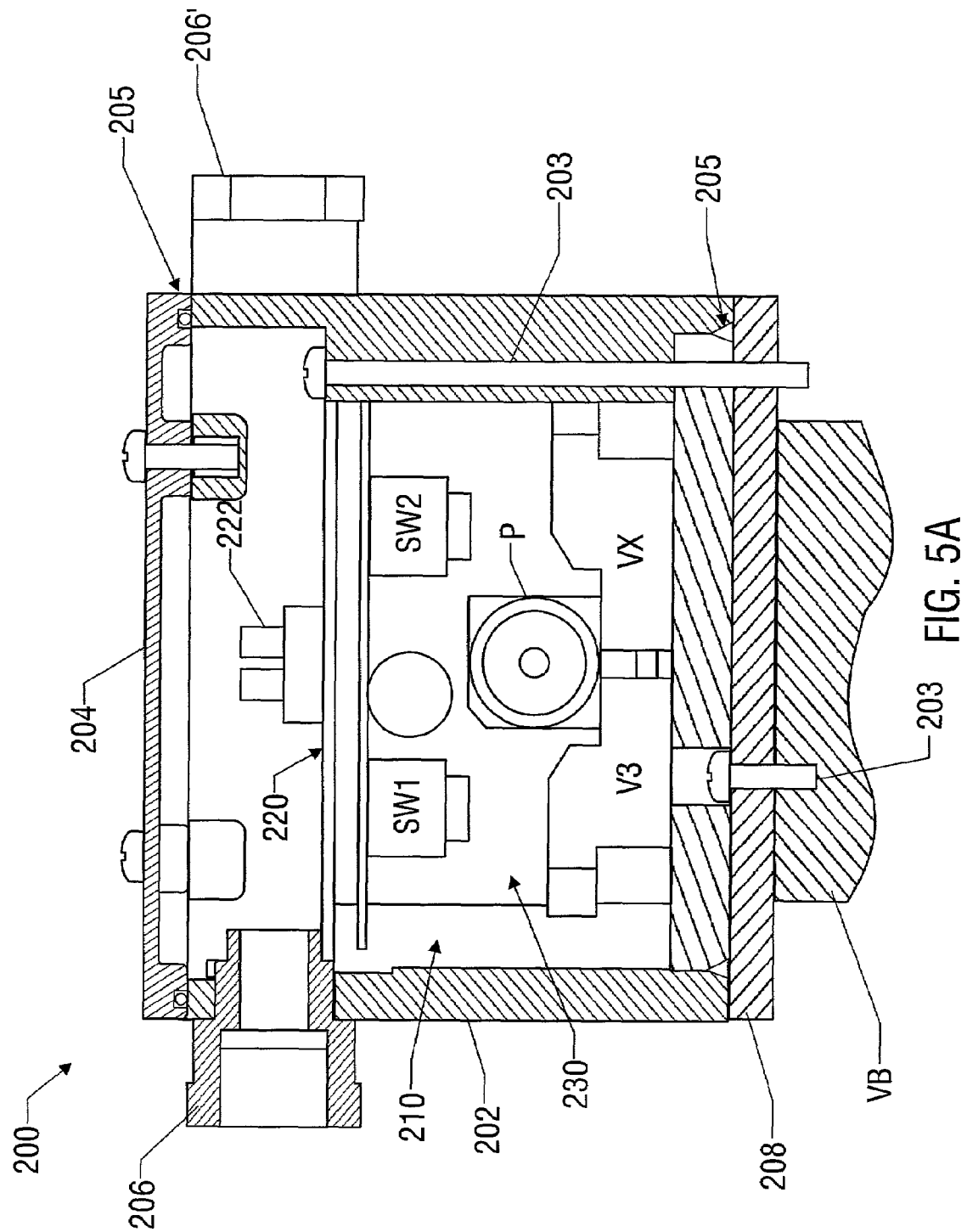
FIG. 5A–B illustrate an embodiment of an automated valve proving device according to the present invention.

Referring to FIG. 5A, an embodiment of an automated proving device 200 is illustrated in cross-section. In the discussion following herein, the device 200 may be used in conjunction with two independent safety shut-off valves on a fuel train or with a double block valve on the fuel train. It is particularly advantageous to use the device 200 with the embodiment of a double block valve as described above. As such, the device 200 may mount directly to the valve body of a double block valve as embodied herein. The device 200 may connect to the test ports for the upstream portion, the downstream portion, and the enclosed space of the double block valve as embodied in FIGS. 1–3.

The device 200 includes an enclosure 202, a cover 204, and watertight connectors 206, 206'. The enclosure 202 pad mounts to the outside of a valve body VB with a plurality of mounting bolts 203, and the cover 204 attaches to the enclosure 202. The watertight connectors 206, 206' are conduits into the enclosure 202 for the passage of wires (not shown). The enclosure 202 and cover 204 are further sealed with O-ring seals 205.

The enclosure 202 contains an automated valve proving system 210. The valve proving system 210 is used for proving the individual integrity of the seals for the safety shut-off valves on the fuel train. The valve proving system 210 includes control circuitry 220 and a fluid module 230. The control circuitry 220 may include a microprocessor, relays, or timing circuits, among other electronics for controlling the automated valve proving system 210. The control circuitry 220 mounts to a PC board assessable with the removal of the cover 204 and may have a terminal connector 222 and a regulated power supply. In addition, a double-pole, single-throw start-up relay (not shown) may be provided to interface with a monitoring system (not shown) for the main burner flame.

The fluid module 230 may be a hydraulic or pneumatic module. The fluid module 230 includes a miniature vacuum pump P, a pair of three-way solenoid valves V3 and VX, and two pressure sensors SW1 and SW2. The pressure sensors SW1, SW2 may be pressure switches or transducers.

Figure 5B:
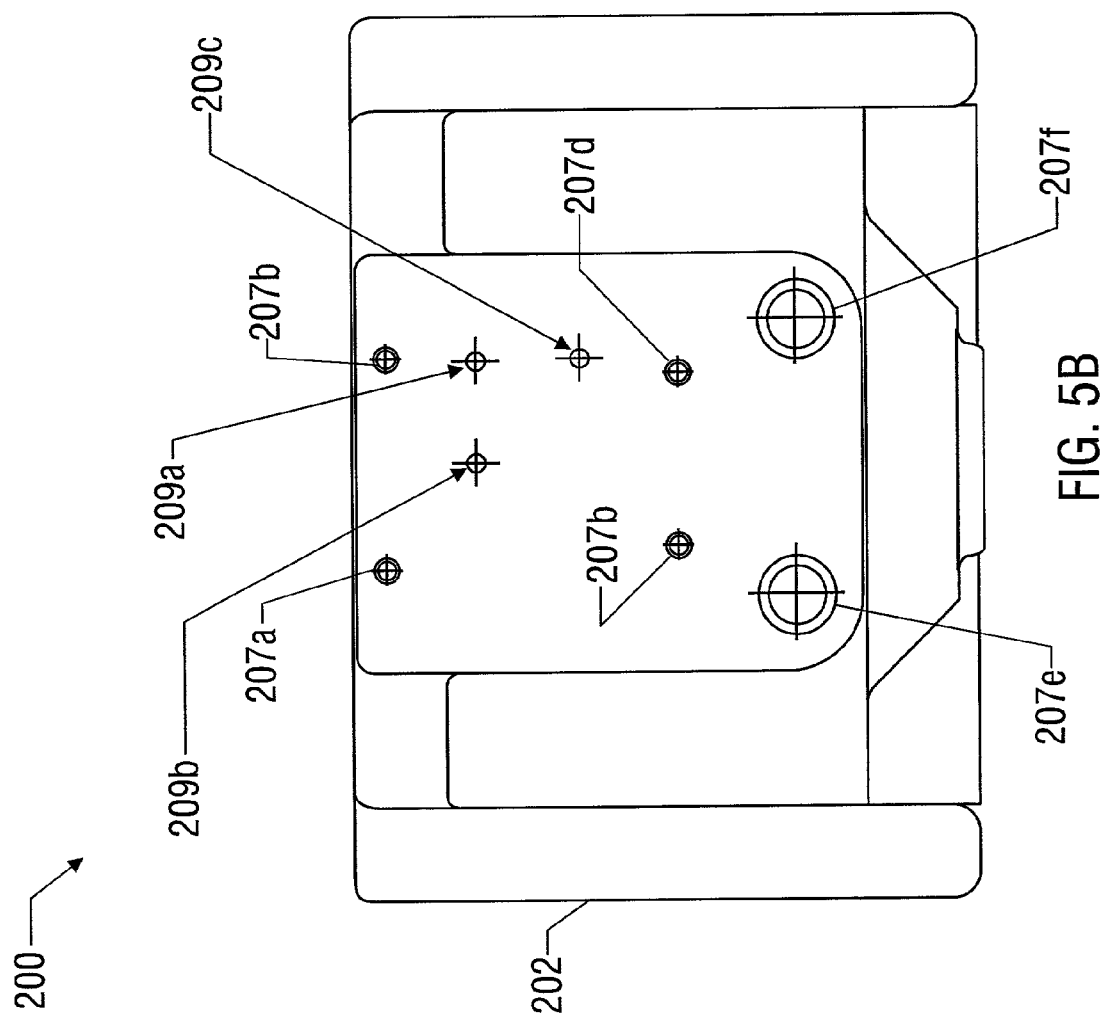

Turning to FIG. 5B, a bottom view of the device 200 is illustrated. The bottom of the enclosure 202 includes ports 209a–c for connecting to test ports (not shown) on the outside of the double block valve (not shown). The enclosure 202 also includes the mounting holes 207a–d and the larger bolt holes 207e–f. The corner port 209a is designated for communicating with the enclosed space of the double block valve. The adjacent port 209b is designated for communicating with the downstream portion of the double block valve, and the adjacent port 209c is designated for communicating with the upstream portion of the double block valve.

The ports 209a–c are arranged with respect to the mounting holes 207a–d and the bolt holes 207e–f so that the pressure-testing device 200 of FIGS. 5A–B may be mounted on either side of the double block valve. Furthermore, the arrangement insures that the ports 209a–c properly connect with the test ports on the valve so that the pressure testing device 200 may not be improperly connected to the test ports of the valve.

Referring to FIGS. 6A–6E, operation of an automated valve proving system 210 is schematically illustrated according to the present invention. In the discussion following herein, the automated valve proving system 210 may be used in conjunction with two independent safety shut-off valves on a fuel train or with a double block valve on the fuel train. It is particularly advantageous to use the automated valve proving system 210 with the embodiment of a double block valve as described above. It is further advantageous to use the automated valve proving system 210 with the proving device embodied in FIGS. 5A–B above.

In FIGS. 6A–6F, the proving system 210 connects to a valve train 300. The valve train 300 couples a feed line 302 to a burner line 304. The feed line 302 brings fluid fuel from a source (not shown), which may be at pressure of 0 to 25 psi above ambient, to the valve train 300. The burner line 304 carries the fluid fuel from the valve train 300 to a burner (not shown), which may be at ambient pressure of approximately 14.7 psia.

In general, the valve train 300 may include two, separate safety shut-off valves V1 and V2 having a connection, such as a pipe, between them that establishes a controlled volume CV. In the present embodiment, however, the valve train 300 may define a double block valve as disclosed herein. In such an implementation, the safety shut-off valve V1 defines a first blocking assembly; the safety shut-off valve V2 defines a second blocking assembly; and the controlled volume CV defines an enclosed space established between the first and second blocking assemblies.

For the purposes of simplicity, representative values are provided below relating specifically to the use of the proving system 210 with the double block valve embodied in FIGS. 2–3. It is understood that the representative values including, but not limited to the size of pumps, the levels of pressures, or the intervals of time, may vary with other implementations of the proving system 210 for a given valve train 300 or other double block valve having differing dimensions.

The proving system 210 includes control circuitry 220 coupled to a fluid module 230. The fluid module 230 may be a hydraulic or pneumatic module. The fluid module 230 includes the three-way valves V3 and VX, the pressure sensors SW1 and SW2, and a pump P, all of which are interconnected through pneumatic or hydraulic conduits. The three-way valve V3 connects to the controlled volume CV on the valve train 300 through a port or inlet 310. The three-way valve V3 then interconnects with the pressure sensors SW1 and SW2, the pump P, and the other three-way valve VX through a main conduit 232. The three-way valve V3 also interconnects with the other three-way valve VX through a bypass conduit 234. Finally, the three-way valve VX connects to the downstream portion of the valve train 300 through a port or outlet 312.

In one embodiment, the pressure sensors SW1 and SW2 may be pressure transducers. Use of pressure transducers is particularly advantageous when further using the present proving system 210 to determine the flow rate through the valve train 300. Because the pressure transducers SW1 and SW2 are already part of the proving system 210, measuring the upstream pressure may be readily done by connecting the existing proving system 210 to an upstream port (not shown) on the upstream side of the valve train 300. This could be achieved in a number of ways, including the addition of a third three-way valve (not shown) communicating the upstream port to the main conduit 232. Measuring the upstream and downstream pressures with the transducers SW1 or SW2 would allow the flow rate of the valve train 300 to be determined. It is within the relative skill of one in the art to provide such modifications.

In another embodiment, the pressure sensors SW1 and SW2 are pressure switches. The pressure switches SW1 and SW2 may be diaphragm style switches having a dry contact. The pressure switches SW1 and SW2 may be without any hysterisis or deadband between the triggering pressure and the point where the switch obtains continuity. The pressure switches SW1 and SW2 are oppositely biased, and each are set to establish continuity at threshold pressures. Pressure switch SW1 is biased to establish continuity or contact to a threshold pressure above ambient, such as 0.5 psig.

The threshold may be set very near to ambient in order to detect more readily the pressure accumulation in the controlled volume CV due to a leak in the main safety shut-off valve V1. The time to build pressure in the controlled volume CV is relatively short, which allows for the alarm to trip promptly. Of course, the threshold of the first switch SW1 may be made even more sensitive than 0.5 psig if the pressure of the feed line 302 is less than that value.

Pressure switch SW2 establishes continuity to a threshold pressure below ambient, such a −4.5 psig, corresponding to the presence of a partial vacuum. The pump P moves fuel fluid, gas, and air through the main conduit 232 from the valve V3 to the valve VX. The pump P may be a miniature pump, such as used in the medical industry, providing a pumping capacity of 150 cc/min. and a maximum head pressure of approximately 9-psi.

The pressure switches SW1 and SW2 are used to determine or measure volumetric flow rate by measuring changes in pressure of a known volume over a time interval. Although the present embodiment includes the pressure switches SW1 and SW2, it is understood the other devices exist in the art for determining or measuring pressure. Furthermore, it is understood that other devices and methods exist in the art for determining or measuring volumetric flow rate. For example, volumetric flow rate may be determined or measured using flow meters based on, but not limited to, differential pressure, positive displacement, or rotating turbines. In addition, methods using electromagnetic, ultrasonic, thermal, and coriolis measurements are also known in the art for determining or measuring volumetric flow rate.

In general, the proving system 210 may test the valve train 300 before each burner start-up and/or after each burner shut-off. The proving system 210 employs both timed decay and pressure accumulation to test the integrity of the valve seals in the valves V1 and V2. Self-diagnostics may be performed on all internal components prior to start-up of the proving system 210. Furthermore, a vacuum is used to check integrity of the valve seals in the valves V1 and V2. The vacuum eliminates the need to produce testing pressures above the pressure in the feed line 302, which is a conventional practice in the art.

Testing for leakage in the valves V1 and V2 is based upon volumetric flow where a fixed or controlled volume is checked at fixed time intervals. By measuring the build-up of pressure to a certain level in the fixed volume within a fixed time interval, the volumetric flow rate into the fixed volume may be calculated. The use of volumetric flow testing allows the proving system 210 to check for leakage rates at several levels of magnitude less than current systems in the art. Current industry standards, such as the Underwriter's Limited standard UL 429, mandate a leakage rate of no more than 4 cc/min. per inch of orifice diameter for the safety shut-off valves of a burner fuel train. For the double block valve embodied in FIGS. 2–3 having an approximate 2" diameter fluid passageway between the upstream and downstream portions, the acceptable leakage rate is approximately 8 cc/min.

Figure 6A:
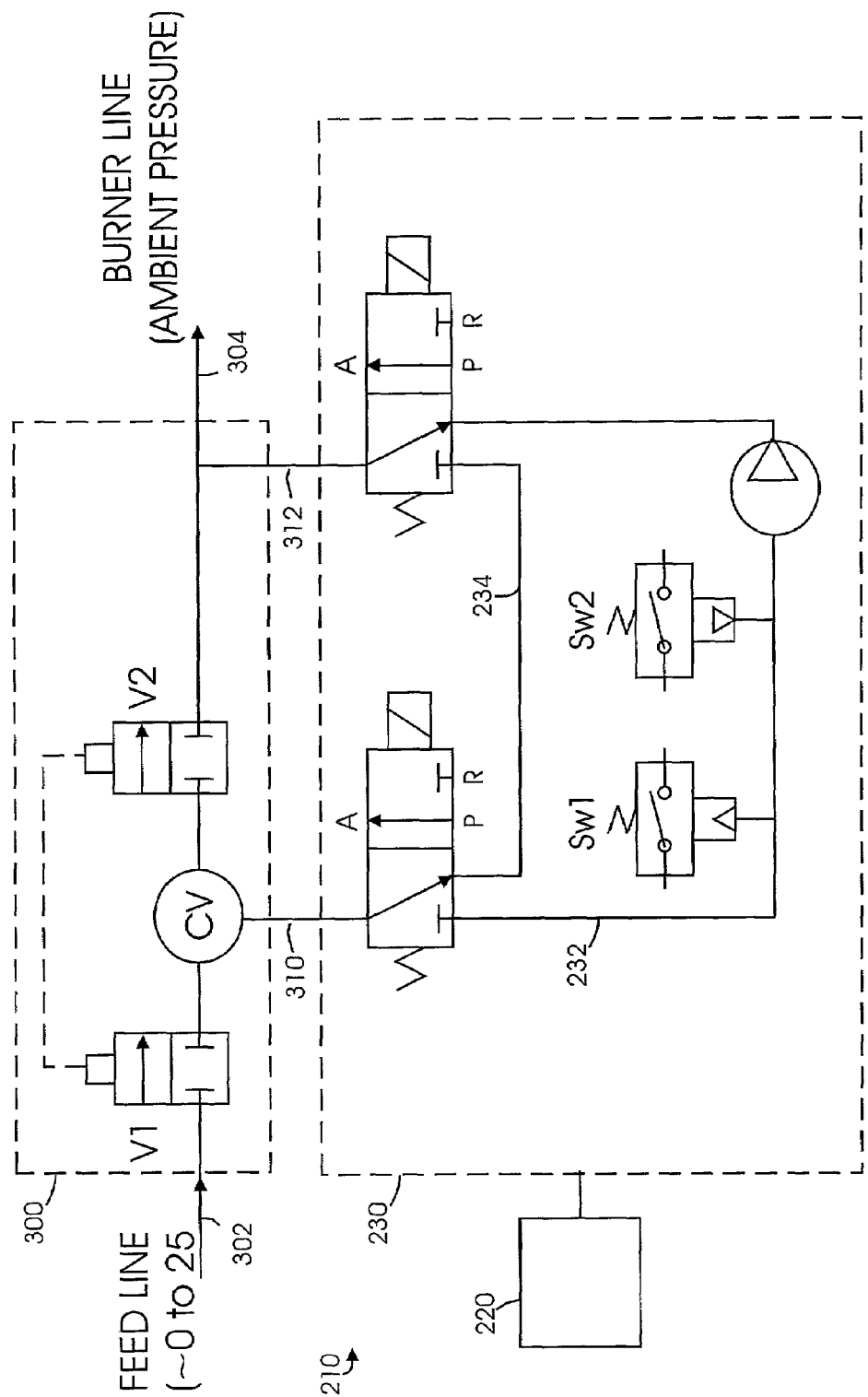
FIGS. 6A–6E schematically illustrate operation of an automated proving system according to the present invention.

Turning first to FIGS. 6A, the proving system 210 is first illustrated when power is off to the burner (not shown), the safety shut-off valves V1 and V2, and the proving system 210, such as after burner shutdown. The control circuitry 220 activates the proving system 210 to check the main safety shut off valves V1 and V2 upon shutdown of the burner. The check insures that there is no leakage from the feed line 302 to the burner line 304 through the valves V1 and V2, which would cause an unsafe build-up of fluid fuel in the burner when it is off.

At burner shutdown, the main safety shut-off valve V1 and V2 are de-energized to keep fluid fuel from traveling from the feed line 302 to the burner line 304. The three-way valve V3 and the three-way valve VX are in a de-energized state so that the bypass conduit 234 is closed. A start-up relay (not shown) in the control circuitry 220 is left open so that power is not applied to the fluid module 230. With proper sealing of the valves V1 and V2, the controlled volume CV is fixed. Of course, components of the fluid module 230, such as the valves V3 and VX, must also be adequately sealed.

Figure 6B:
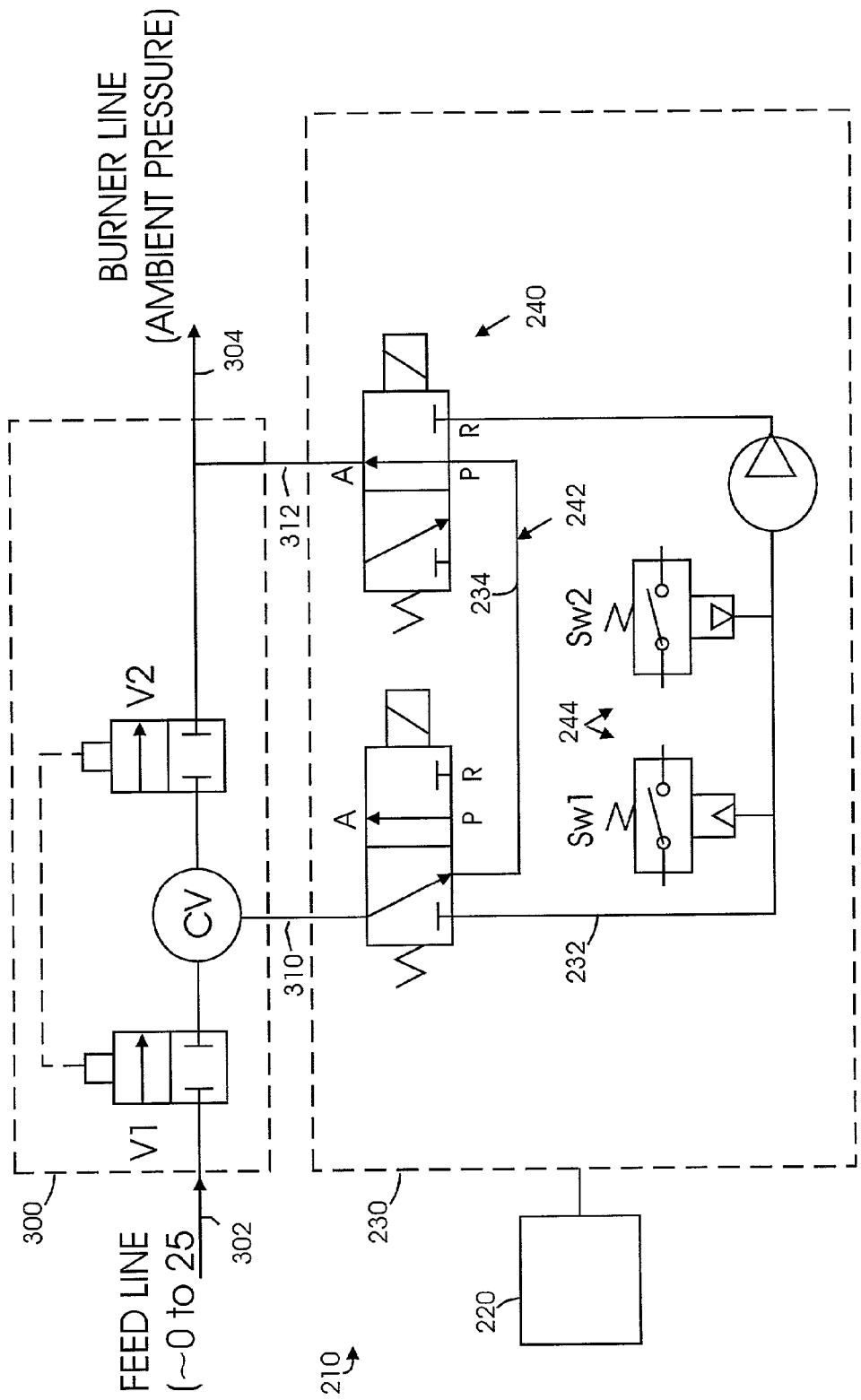

Turning to FIG. 6B, power is applied to the proving system 210. The valve VX is energized 240, which connects the controlled volume CV to the downstream portion of the valve train 300 through the bypass conduit 234. Any fluid in the controlled volume CV is purged 242 to the downstream side of the valve V2, and the pressure of the controlled volume CV is equalized with the ambient pressure of the downstream side. After a short time interval, such as two seconds, the pressure switches SW1 (biased for positive gauge pressure) and SW2 (biased for negative gauge pressure) are checked 244 for continuity. Continuity corresponds to when the pressure level on a given pressure switch exceeds the biasing of the pressure switch. An electrical contact is created within the switch if the given pressure exceeds the threshold of the switch.

If no continuity is detected, i.e., the SW1 and SW2 are open; the proving system 210 continues operation. On the other hand, if either switch SW1 or switch SW2 establishes continuity, then the pressure switch may be damaged. This would indicate a failure condition. The control circuitry 220 provides an output alarm that prevents the main safety shut-off valves V1 and V2 from being opened. The self-diagnostic check of the valve V3 and VX, switches SW1 and SW2, and fluid module 230 insures proper testing of the integrity of the seals in the safety shut-off valves V1 and V2 in the steps that follow.

Figure 6C:
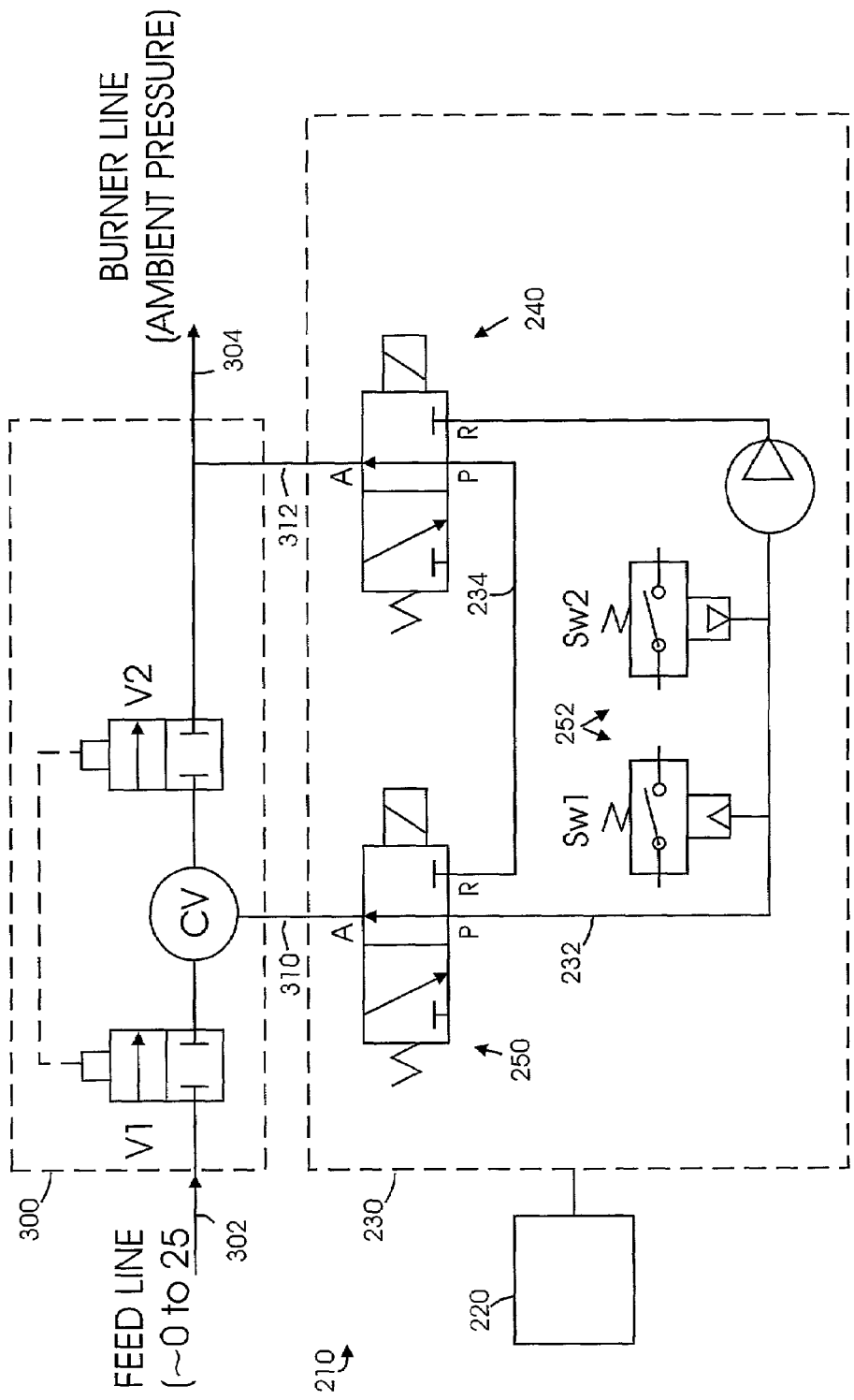

With the self-diagnostic check completed without an alarm condition detected, the main safety shut-off valve V1 is checked for leakage using a pressure accumulation test. Turning to FIG. 6C, the three-way valve VX remains energized 240, and the valve V3 is energized 250. The bypass conduit 234 is closed. The valve V3 communicates the controlled volume CV with the pressure switches SW1 and SW2 through the main conduit 232. After a short time interval, such as two seconds, the proving system 210 performs a check 252 of the pressure switches SW1 and SW2 for continuity. If no continuity is detected, the proving system 210 proceeds. If either pressure switch SW1 or SW2 is closed, a failure condition exists. Continuity in SW1 would indicate the presence of pressure above ambient in the controlled volume CV. Ideally, the purging of the controlled volume CV as described above has equalized the controlled volume CV to ambient pressure. Any elevated pressure above ambient in the controlled volume CV is most likely due to the valve V1 leaking fluid from the feed line 302 to the controlled volume CV. Continuity in the vacuum switch SW2 would be less likely to occur, because SW2 indicates the presence of a partial vacuum in the controlled volume CV. With continuity in either of the switches SW1 or SW1, the control circuitry 220 initiates an output alarm that prevents the main safety shut-off valves V1 and V2 from opening.

Figure 6D:
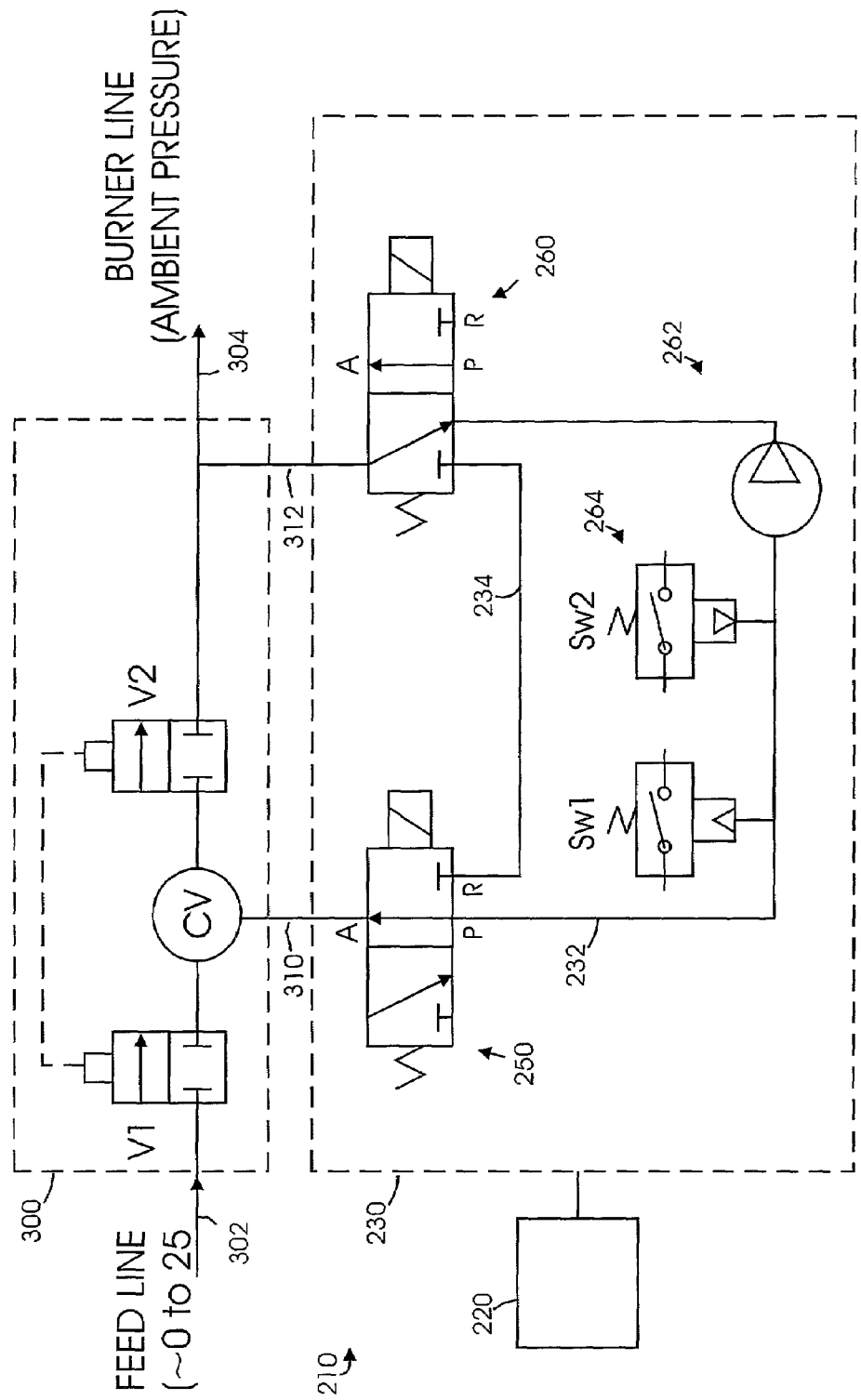

Without an alarm condition detected above, the proving system 210 initiates a pumping cycle to detect discrete leakage of either safety shut-off valve V1 or V2. Turning to FIG. 6D, the valve VX is de-energized 260 to close the bypass conduit 234. The valve V3 remains energized 250 to communicate the controlled volume CV with the switches SW1 and SW2 and the pump P. The vacuum pump P is started 262. Air or fluid is evacuated from the controlled volume CV to the downstream side of the valve train 300. The pump P runs for a time interval, such as 15 seconds, to create a vacuum in the controlled volume CV. As the pressure in the controlled volume CV is brought below ambient, any leakage through valves V1 and V2 would allow fluid or air into the controlled volume CV, thus undermining the pump's effort to produce a vacuum therein. During the operation of the pump P, the vacuum switch SW2 is checked 264 for continuity. If the pressure switch SW2 closes in a shortened time interval, such as 7 seconds, then a vacuum is successfully being produced in the controlled volume CV by the pump P. The pressure switch SW1 may also be checked to determine whether a positive pressure exists and the vacuum switch SW2 indicates otherwise. This may be due to damage to the switches, among other reasons. Without an alarm condition, the proving system 210 continues operating.

In the event that the pressure switch SW2 does not close within the shortened time period as the pump P operates or does not respond at all, the proving system 210 indicates an alarm condition. Without the pressure switch SW2 closing, a vacuum is not successfully being created in the controlled volume CV. This could be due to leakage in the safety shut-off valves V1 or V2 leaking fluid or air into the controlled volume CV. Consequently, the control circuitry 220 initiates an alarm condition that prevents the main safety shut-off valves V1 and V2 from opening.

Figure 6E:
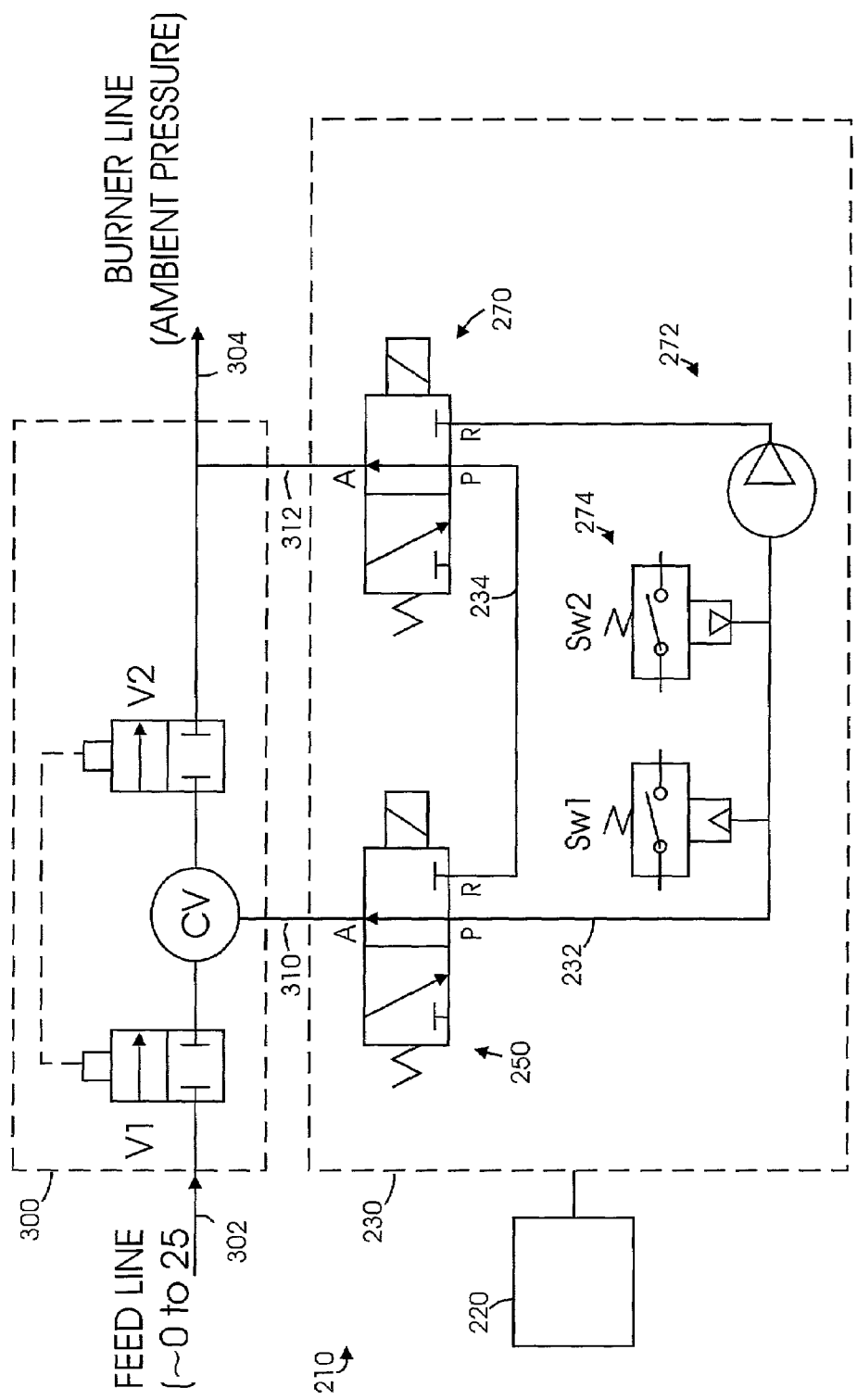

Turning to FIG. 6E, the proving system 210 initiates a decay timing circuit to detect discrete leakage in the safety shut-off valves V1 or V2. If the pressure switch SW2 closes before the shortened time interval during the evacuation of fluid from the controlled volume CV, the vacuum pump P runs for an additional period, say 5 more seconds, to ensure that a final, partial vacuum is achieved in the controlled volume CV. The pump P then turns off 272. The valve VX is then energized 270, closing the communication of the main conduit 232 to the downstream side of the valve V2. The valve V3 remains energized 250, and the bypass conduit 234 remains closed. The controlled volume CV communicates with the pressure switches SW1 and SW2.

A decay timing circuit (not shown) starts in the control circuitry 220. Due to the partial vacuum created in the controlled volume CV, the vacuum switch SW2 ideally stays in a closed state. The vacuum switch SW2 is checked 274 for continuity. If the pressure switch SW2 opens before a designated time interval, such as 20 seconds, the control circuitry 210 indicates a failure condition. The lose of vacuum in the controlled volume CV may be due to a slow, discrete leak in either of the two safety shut off valves V1 or V2. An output alarm is initiated that prevents the main safety shut-off valves V1 and V2 from opening. On the other hand, if the pressure switch SW2 remains closed during the designated time interval, the control circuitry 220 indicates that the main safety shut-off valves V1 and V2 have passed the seal integrity test. The period of time for the decay timing circuit may be particularly calculated to detect a leakage rate that meets or exceeds the industry standards.

In order to protect the vacuum pump P after the completion of the testing, a second purge cycle is initiated to remove any vacuum between valve V3 and the pump P. The second purge cycle is accomplished by de-energizing the valve V3 for a shortened time interval, such as 3 seconds, which allows fluid or air to enter the controlled volume CV through the bypass conduit 234. The valve V3 is then re-energized to equalize the main conduit 232 with the controlled volume CV. The output relay (not shown) in the control circuitry 220 then closes and locks. The output relay remains on and the valve VX goes to a low current mode. Thus, the proving system 210 remains idle until burner start-up.

For the operation of the proving system 210 at burner start-up, the main safety shut-off valves V1 and V2 begin to open upon receipt of a control signal from the burner control unit (not shown). The pressure switch SW2 opens, if not already open, due to a pressure rise. The valve V3 is de-energized before valve V1 and V2 open, and valve VX remains energized to keep the bypass conduit 234 open through secondary contacts of the locking relay that isolates the pump P from the proving system 210. Isolation of the pump P prevents possible damage to the pump P due to nozzle clogging. The proving system 210 remains idle until loss of power to the proving system 210, in which case the control circuitry 220 automatically resets the unit to the arrangement of FIG. 6A.

While the invention has been described with reference to the preferred embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A system for proving sealing engagement of first and second safety shut-off valves, the first and second safety shut-off valves establishing a controlled volume therebetween, the system comprising:
- a device for determining or measuring volumetric flow rate;
- a pump in fluid communication with the device for determining or measuring volumetric flow rate;
- a first selectable valve having an inlet and first and second outlets, the inlet connectable to the controlled volume, the first outlet connected to the pump;
- a second selectable valve having first and second inlets and an outlet, the first inlet connected to the pump, the second inlet connected to the second outlet of the first selectable valve, the outlet in communication with an outlet of the second safety shut-off valve;
- wherein the first selectable valve is selectively operable to communicate the controlled volume with the device for determining or measuring volumetric flow rate and the pump or with the second selectable valve, and
- wherein the second selectable valve is selectively operable to communicate the outlet of the second safety shut-off valve with the first selectable valve or with the device for determining or measuring volumetric flow rate and the pump.

2. The system of claim 1, further comprising control circuitry operating the first selectable valve, the second selectable valve, the pump, and monitoring the device for determining or measuring volumetric flow rate.

3. The system of claim 1, wherein the outlet of the second safety shut-off valve is downstream of the second safety shut-off valve.

4. The system of claim 1, wherein the proving system purges fluid from the controlled volume to the outlet of the second safety shut-off valve.

5. The system of claim 1, further comprising a second device for determining or measuring volumetric flow rate, wherein the devices comprise a first pressure switch biased to attain continuity at a first threshold pressure and a second pressure switch biased to attain continuity at a second threshold pressure.

6. The system of claim 1, wherein the proving system measures for an accumulation of pressure in the controlled volume to a first level within a first time interval.

7. The system of claim 6, wherein a first alarm is indicated if the pressure in the controlled volume accumulates above the first level within the first time interval.

8. The system of claim 1, wherein the pump creates a partial vacuum within the controlled volume.

9. The system of claim 8, wherein the device for determining or measuring volumetric flow rate measures for a change in pressure in the controlled volume to a second level within a second time interval during creation of the partial vacuum.

10. The system of claim 9, wherein a second alarm is indicated if the change in the pressure in the controlled volume fails to attain the second level within the second time interval.

11. The system of claim 8, wherein the device for determining or measuring volumetric flow rate measures for an accumulation of pressure in the controlled volume to a third level within a third time interval after creation of the partial vacuum.

12. The system of claim 11, wherein a third alarm is indicated if the pressure in the controlled volume accumulates above the third level within the third time interval.

13. A device for proving sealing engagement of first and second safety shut-off valves, comprising:
- a first port communicating with a finite volume established between the safety shut-off valves;
- a second port communicating with an outlet of the second safety shut-off valve;
- a first three-way valve having an inlet connected to the first port and first and second outlets connected to a bypass conduit and a main conduit, respectively, the first three-way valve selectively operable to communicate the first port to either the bypass conduit or the main conduit;
- one or more devices for determining or measuring volumetric flow rate, the one or more devices being connected to the main conduit;
- a pump connected to the main conduit and operable to evacuate fluid from the controlled volume to the outlet of the second safety shut-off valve; and
- a second three-way valve having a first inlet connected to the main conduit and a second inlet connected to the bypass conduit, the second three-way valve selectively operable to communicate the second port to either the bypass conduit or the main conduit.

14. The device of claim 13, wherein the device couples to a double block valve.

15. The device of claim 14, wherein the outlet is connected to a downstream portion of the double block valve.

16. The device of claim 13, further comprising control circuitry operating the first three-way valve, the second three-way valve, and the pump and monitoring the one or more devices for determining or measuring.

17. The device of claim 13, wherein the one or more devices for determining or measuring volumetric flow rate comprise a first pressure switch biased to attain continuity at a first threshold pressure and a second pressure switch biased to attain continuity at a second threshold pressure.

18. The device of claim 17, wherein the first threshold pressure is a positive gauge pressure, and wherein the second threshold pressure is a negative gauge pressure.

19. A method for proving sealing engagement of a first safety shut-off valve and a second safety shut-off valve, comprising the steps of:
- a) closing the safety shut-off valves to establish a controlled volume therebetween;
- b) purging fluid from the controlled volume;
- c) measuring for a first volumetric flow rate within the controlled volume; and
- d) indicating a first alarm condition if the first volumetric flow rate exceeds a first predetermined rate.

20. The method of claim 19, wherein the step (c) comprises the step of measuring for an accumulation in pressure within the controlled volume to a first pressure level within a first time interval.

21. The method of claim 19, further comprising:
- e) reducing pressure in the controlled volume to a predetermined level;
- f) measuring for a second volumetric flow rate within the controlled volume; and
- g) indicating a second alarm condition if the second volumetric flow rate in the controlled volume exceeds a second predetermined rate.

22. The method of claim 21, wherein the step (e) comprises the step of pumping fluid from the controlled volume to produce a partial vacuum therein.

23. The method of claim 21, wherein the step (f) comprises the step of measuring for an accumulation of pressure in the controlled volume to a second pressure level within a second time interval.

24. The method of claim 23, wherein the second alarm condition is indicated if the pressure of the controlled volume fails to sustain the second pressure level within the second time interval.

25. The method of claim 21, further comprising the step of:
 h) measuring for pressure in the controlled volume to reach a third pressure level within a third time interval while reducing the pressure in the controlled volume to the predetermined level in step (e).

26. The method of claim 25, further comprising the step of:
 i) indicating a third alarm condition if the pressure in the controlled volume fails to reach the third pressure level within the third time interval.

* * * * *

UNITED STATES PATENT AND TRADEMARK OFFICE
CERTIFICATE OF CORRECTION

PATENT NO. : 6,968,851 B2  
APPLICATION NO. : 10/120899  
DATED : November 29, 2005  
INVENTOR(S) : James Ramirez et al.

Page 1 of 1

It is certified that error appears in the above-identified patent and that said Letters Patent is hereby corrected as shown below:

On the Title Page of the patent:

At item (75), lines 1-2, please delete "James Ramirez, Randolph, NJ (US); Edward Dorsey, Randolph, NJ (US);"

At item (75), line 4, please delete "Dennis Wagner, Newton, NJ (US)"

Signed and Sealed this

Twelfth Day of February, 2008

JON W. DUDAS  
*Director of the United States Patent and Trademark Office*